Patented Oct. 5, 1937

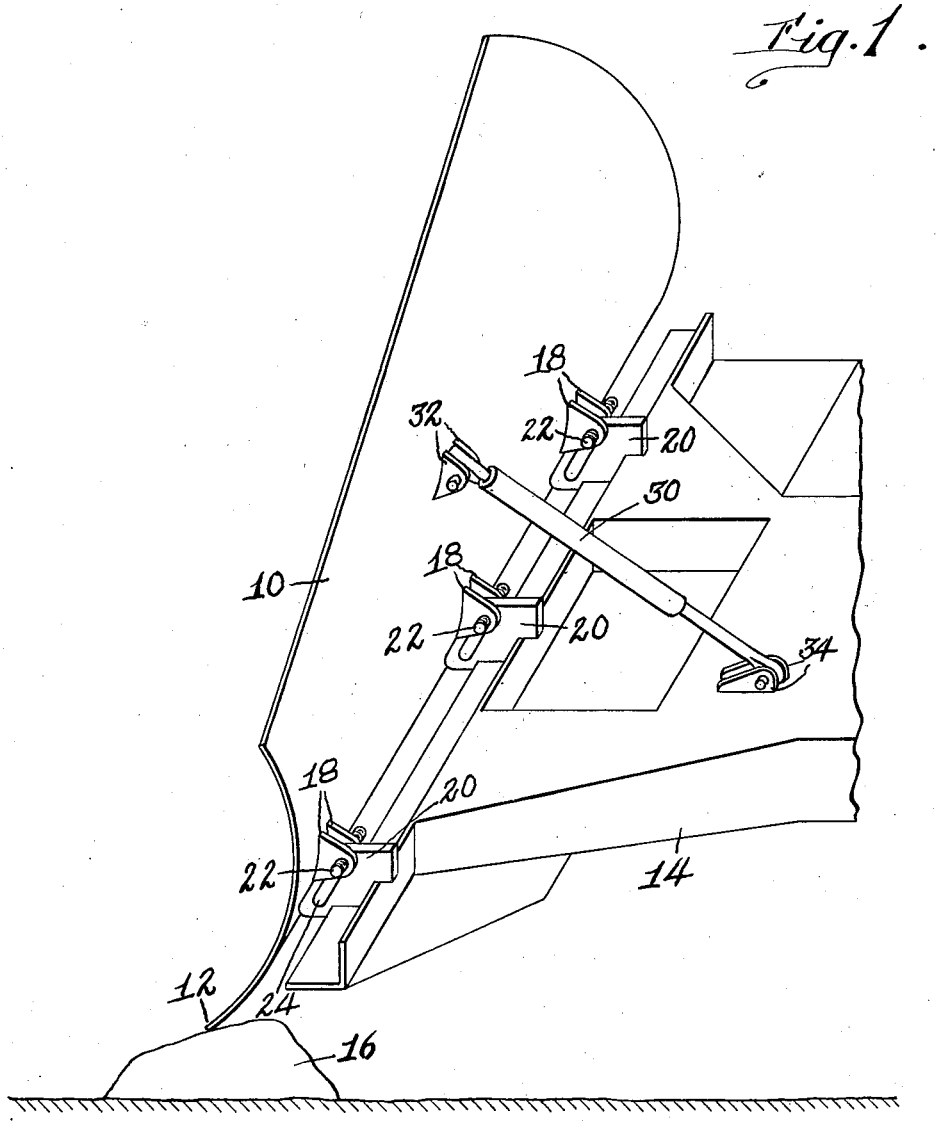

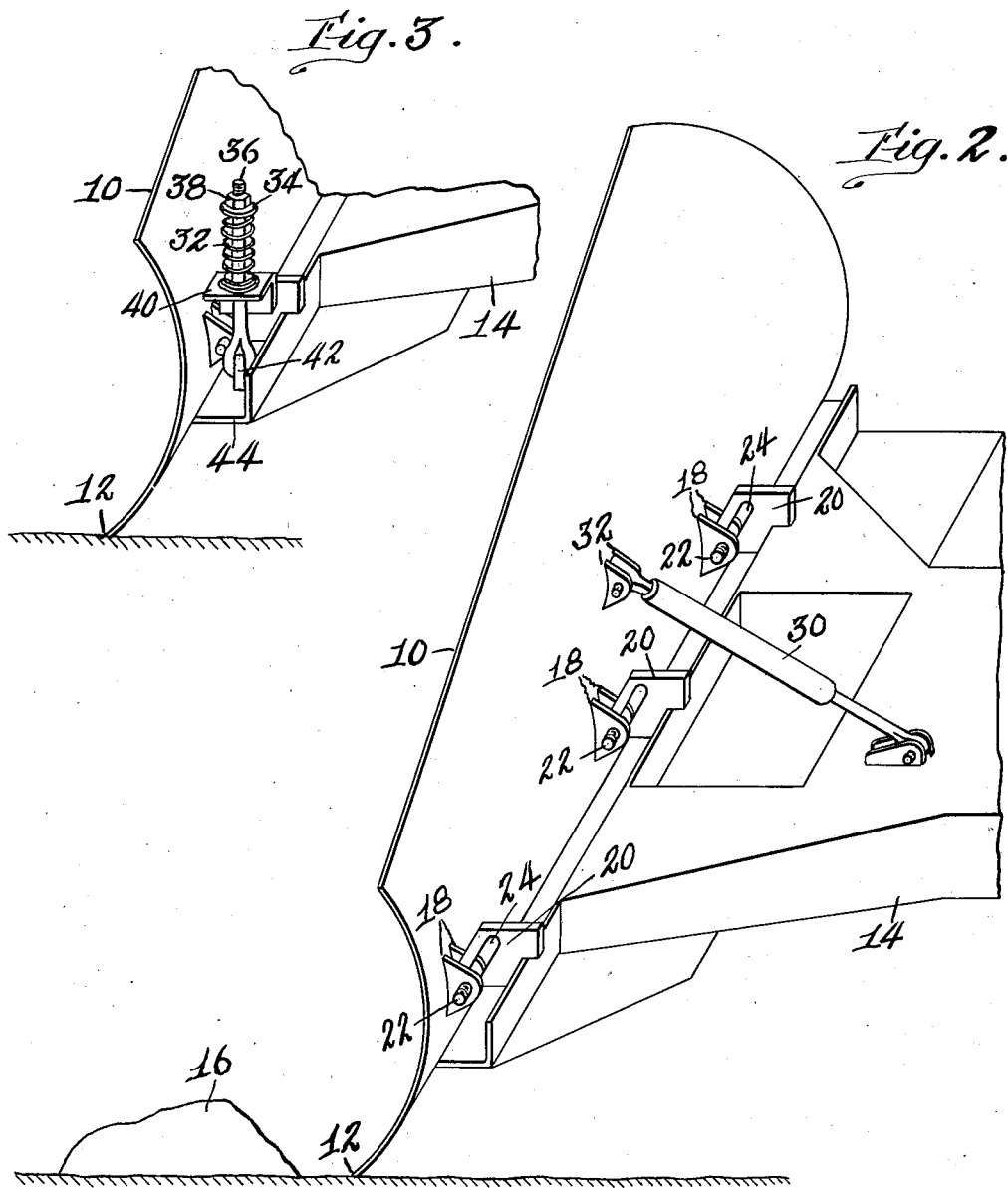

2,095,096

UNITED STATES PATENT OFFICE 2,095,096

SNOWPLOW

Albert F. Humphrey, Somerville, Mass.

Application July 16, 1936, Serial No. 90,845

4 Claims. (Cl. 37—42)

This invention relates to a snowplow.

The invention has for an object to provide a novel snowplow whose construction is such as to enable the plow blade to pass over obstructions in the path being plowed with minimum liability of damage to the snowplow.

A further object of the invention is to provide a novel construction of snowplow in which provision is made for causing the plow blade to automatically rise when the lower edge of the blade encounters an obstruction, to thereby permit the plow blade to ride over the obstruction without damage to the blade or the other parts of the plow.

With these general objects in view, and such others as may hereinafter appear, the invention consists in the snowplow hereinafter described and particularly defined in the claims at the end of this specification.

In the drawings illustrating the preferred embodiment of the invention, Fig. 1 is a perspective view of the present snowplow with the plow blade elevated in passing over an obstruction; Fig. 2 is a similar view with the plow blade in normal plowing position; and Fig. 3 is a detail in perspective to be referred to.

In general the invention finds particular use when embodied in a snowplow of the type adapted to be attached to a motor vehicle such as a truck and used in plowing snow from highways. Prior to the present invention considerable damage has been done to the plow blades of snowplows of this type when the blade has encountered an obstruction in the path being plowed, such as a projecting rock, a car rail, a manhole cover, or other obstruction which projects above the surface of the road or highway being plowed. When the plow blade of a snowplow embodying the present invention encounters such an obstruction, provision is made for causing the plow blade to ride over the obstruction without damage to either the plow blade or the other parts of the plow.

Referring now to the drawings, 10 represents a plow blade which may be of any usual or preferred shape adapted to plow the snow to the side of the roadway. As herein shown, the plow blade is curved and the lower edge portion 12 thereof is arranged to extend forwardly. The plow blade is operatively supported upon a push frame 14, and the latter may also be of any usual or preferred construction, capable of being secured to the motor vehicle.

In accordance with the present invention, provision is made for operatively supporting the plow blade 10 upon the push frame 14 in a manner such as to permit the plow blade to rise automatically when the lower edge of the plow blade encounters an obstruction, such as a rock, car rail, manhole cover, or the like, indicated at 16. As herein shown, the plow blade is provided with three sets of ears 18 between which corresponding slotted guide brackets 20 are received. The latter are secured to the forward end of the push frame 14, and pins 22 are extended through the slots 24 in the guide brackets to operatively support the plow blade upon the push frame. The slots 24 are preferably arranged to extend upwardly and rearwardly to permit the plow blade to move upwardly and rearwardly when the lower edge 12 of the blade encounters an obstruction such as 16, and are made of sufficient length so that the required movement of the plow blade may take place in order to permit the blade to ride over the various obstructions usually encountered in the practical use of the plow. The inclination of the slots 24 however is such that the normal pressure of the snow upon the forward surface of the plow blade operates to hold the plow downwardly during the plowing operation, and so that no tendency exists for the plow to chatter during plowing over ordinary roads.

The plow blade 10 is preferably further connected to the push frame 14 by a strut 30 which, as herein shown, is pivoted to ears 32, 34 upon the rear surface of the plow blade and upon the push frame respectively. When the plow blade is caused to rise by the obstruction pressure on the forward lower edge of the plow blade, the strut 30 pivots with respect to both the push frame and plow blade, thus permitting the desired elevation of the plow blade. In practice and as above stated, the slots 24 in the guide brackets are made of sufficient length to permit the plow to rise over any obstruction which would ordinarily be encountered, and after having risen and having passed over the obstruction, the plow blade 10 is caused to return to its normal operating position with the pins 22 in the lower portions of the slots 24 either by the weight of the plow blade or if desired each end of the plow blade may be provided with a spring 32 arranged as shown in Fig. 3 as interposed between a collar 34 secured to a rod 36 by a nut 38 on the threaded end of the rod, and a bracket 40 secured to and projecting from the rear surface of the plow blade. The lower end of the rod is attached by an eye bolt 42 to an angle piece 44 forming part of the push frame. As will be apparent from inspection of Fig. 3, as the plow lifts, the springs 32 are compressed and when the plow blade has passed over the obstruction the compression thus set up in the springs serves to assist in returning the plow to operative plowing position.

While the preferred embodiment of the invention has been herein illustrated and described, it will be understood that the invention may be embodied in other forms within the scope of the following claims.

Having thus described the invention what is claimed is:—

1. In a snowplow, in combination, a supporting push frame, a plow blade, and means for operatively supporting the plow blade upon the push frame including a thrust member between the upper portion of the plow blade and the push frame, a plurality of upwardly and rearwardly extending slots in the push frame, and a plurality of pins carried by the plow blade and extending through said slots whereby to permit obstruction pressure to cause the plow blade to be moved upwardly and rearwardly and thereby permit the blade to pass over the obstruction.

2. In a snowplow, in combination, a supporting push frame, a plow blade, and means for operatively supporting the plow blade upon the push frame, said means including a thrust member between the upper portion of the plow blade and the push frame and a plurality of upwardly and rearwardly extending slots having pins extending through the slots disposed between the plow blade and the push frame.

3. In a snowplow, in combination, a supporting push frame, a plow blade, pin and slot connections for operatively supporting the plow blade upon the push frame, said slots extending upwardly and rearwardly, and pivoted thrust means for further supporting the plow blade upon the push frame.

4. In a snowplow, in combination, a supporting push frame, a plow blade, means for operatively supporting the plow blade upon the push frame to permit the plow blade to move upwardly and rearwardly when the lower portion of the plow blade encounters an obstruction during its movement along the surface being plowed, said means including a thrust member between the upper portion of the plow blade and push frame and pin and slot connections, said slots extending upwardly and rearwardly, and spring means for urging the plow blade into normal operative position after it has passed over the obstruction.

ALBERT F. HUMPHREY.